| United States Patent [19] | [11] Patent Number: 4,482,410 |
| Stephens et al. | [45] Date of Patent: Nov. 13, 1984 |

[54] PLASTICIZER SYSTEM FOR PROPELLANT COMPOSITIONS

[75] Inventors: William D. Stephens, Huntsville, Ala.; Linda E. Jones, Haymarket, Va.

[73] Assignee: The United States of America as represented by the Secretary of the Air Force, Washington, D.C.

[21] Appl. No.: 497,458

[22] Filed: May 23, 1983

[51] Int. Cl.$^3$ .............................................. C06B 45/10
[52] U.S. Cl. ................................. 149/19.4; 149/19.9; 560/263
[58] Field of Search ................... 149/19.1, 19.9, 19.4; 560/263

[56] References Cited

U.S. PATENT DOCUMENTS

| | | | |
|---|---|---|---|
| 2,520,733 | 8/1950 | Morris et al. | 560/263 |
| 3,067,222 | 12/1962 | Anderson | 560/263 |
| 3,609,115 | 9/1971 | Sammons et al. | 149/19.1 |
| 4,243,799 | 1/1981 | Mueller et al. | 560/263 |

*Primary Examiner*—Edward A. Miller
*Attorney, Agent, or Firm*—Donald J. Singer; William J. O'Brien

[57] ABSTRACT

This invention discloses the synthesis of a polytetramethyleneglycol pivalate polyether and its use as a plasticizer for propellant compositions.

1 Claim, No Drawings

PLASTICIZER SYSTEM FOR PROPELLANT COMPOSITIONS

STATEMENT OF GOVERNMENT INTEREST

The invention described herein may be manufactured and used by or for the Government for governmental purposes without the payment of any royalty thereon.

BACKGROUND OF THE INVENTION

This invention relates to solid propellant compositions and to an improved internal plasticizer system for use therewith. In a more particular aspect, this invention concerns itself with a novel family of branch-chained, saturated polyethers of particular molecular structure and to their use as an internal plasticizer for isocyanate-cured propellant compositions.

The increased interest and utilization of solid propellant compositions has spawned a considerable research effort in an attempt to improve their ballistic and physical properties. Generally, solid propellants are composed of one or more organic or inorganic oxidizers dispersed in a resinous binder matrix which may also function as a fuel. Typical oxidizers are ammonium perchlorate or HMX (cyclotetramethylene tetranitramine), both of which are well known in the art. Various resinous components, such as hydrocarbons, polyesters, polyurethanes and other like materials may serve as a binder/fuel matrix. A supplemental fuel component, such as finely powdered aluminum, may be used also. Other additive components, such as anti-oxidants, burning rate modifiers, wetting agents, anti-foaming agents and plasticizers may be added to the propellant composition, if desired. Dibutylphthalate, dioctyl adipate, or triacetin are often employed as inert plasticizers in combination with the resinous binder material.

Plasticizers are used in rocket propellants for a number of reasons. These include processing assistance by incorporation of fluid materials in the propellant mix, the improvement of low temperature flexibility and the improvement of mechanical properties and ballistic characteristics. In using solid propellants, however, a problem exists in the use of plasticizers because of the tendency of plasticizer molecules to migrate or evaporate. Either of these processes results in chemical changes in the composition which are harmful to the propellant and to other inert parts of the rocket motor. On long term storage, changes in mechanical properties of the propellant often occur, particularly near the liner-propellant bond. Other negative effects which are associated with the use of plasticizers, include crystallization at low temperatures, a tendency to soften the propellant excessively at high temperatures, and the fact that the plasticizer may migrate into the liner form the uncured propellant much more rapidly than it does from a cured propellant system. Consequently, a continuing research effort has been conducted in an attempt to solve the migration problem associated with propellant plasticizers, and to provide a plasticizer that does not migrate rapidly even in an uncured propellant.

One research effort involved the use of a material known as ZL-496. This material, ZL-496, is a polybutadiene with a molecular weight of approximately 3,000. The use of ZL-496, as a plasticizer, was contemplated because of its molecular size. It is quite large and it was believed that its polymer chain entanglement would prevent migration. Unfortunately, however, it was found that even plasticizer molecules as large as ZL-496 have a tendency to migrate out of the propellant composition which will ultimately shorten the shelf life of a rocket motor.

In furthering the above research effort, however, it was unexpectdly discovered that a branch-chained, saturated polyether of particular molecular structure could be utilized as a plasticizer in the fabrication of solid propellants. This novel plasticizer replaces the conventional plasticizers generally utilized in composite propellants, especially those having a binder base which utilizes an isocyanate cure reaction for its curing system. The resulting propellant exhibits a minimum amount of plasticizer migration during normal storage and exhibits a very good shelf-life.

SUMMARY OF THE INVENTION

In accordance with this invention, there is provided a family of novel compound which act effectively as plasticizers for propellant compositions without the attendant problems of plasticizer migration which often arise during propellant storage. The plasticizer of this invention are polyethers having a particular moldecular structure as illustrated by the following structure formula.

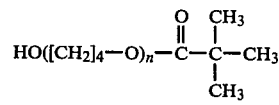

wherein n is an integer of from 6 to 12.

These plasticizers are used in the propellant in a binder/plasticizer ratio ranging from about 75 to 95 parts by weight binder to 5 to 25 parts by weight of plasticizer.

Accordingly, the primary object of this invention is to provide a novel family of polyether plasticizers having a particular molecular structure.

Another object of this invention is to provide a novel solid propellant composition that produces only minimum amounts of plasticizer migration during its shelf-life.

Still another object of this invention is to provide a novel family of pivalate ether plasticizers that find particular utility as internal plasticizers for solid propellant compositions.

The above and still other objects and advantages of the present invention will become more readily apparent upon consideration of the following detailed description thereof.

DESCRIPTION OF THE PREFERRED EMBODIMENTS

With the above-mentioned and other objects in mind, the present invention contemplates the synthesis of a novel family of pivalate ether plasticizers and their utilization as internal plasticizers in a conventional composite solid propellant.

The novel family of plasticizers contemplated by the present invention are branch-chained, saturated, polytetramethyleneglycol pivalate ethers having the following structural formula.

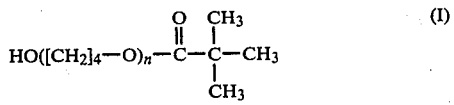

$$HO([CH_2]_4-O)_n-\overset{O}{\overset{\|}{C}}-\underset{\underset{CH_3}{|}}{\overset{\overset{CH_3}{|}}{C}}-CH_3 \quad (I)$$

wherein n is an integer of from 6 to 12.

It is believed that the particular molecular structure illustrated in Formula (I) above provides a particular advantage for the use of these polyethers as internal plasticizers. The plasticizer links to the binder network of the propellant and, therefor, is unable to migrate or evaporate away from the propellant during storage. This provides the propellant with an excellent shelf-life.

The synthesis of the plasticizer of this invention is accomplished by effecting a reaction between an equimolar mixture of pivaloyl chloride and Teracol. This reaction is illustrated by the following reaction scheme.

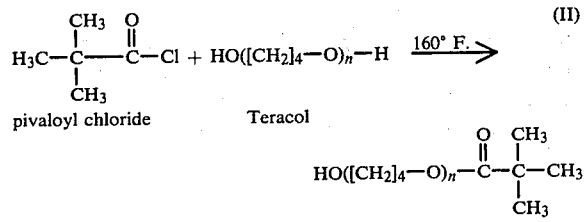

$$H_3C-\underset{\underset{CH_3}{|}}{\overset{\overset{CH_3}{|}}{C}}-\overset{O}{\overset{\|}{C}}-Cl + HO([CH_2]_4-O)_n-H \xrightarrow{160° F.}$$

pivaloyl chloride    Teracol $$HO([CH_2]_4-O)_n-\overset{O}{\overset{\|}{C}}-\underset{\underset{CH_3}{|}}{\overset{\overset{CH_3}{|}}{C}}-CH_3 \quad (II)$$

wherein n is an integer of from 6 to 12.

Example 1, which follows, discloses the experimental details of the reaction and method of synthesis illustrated by equation (II).

EXAMPLE (I)

Polytetramethyleneglycol pivalate 360 grams of (0.554 moles) of Teracol (a hydroxy-terminated polyether with a molecular weight of approximately 650 g/mole) was added to 1200 ml of dry ether and 141 ml of triethyl amine in a 3-liter flask and cooled in an ice bath. 66.7 grams (0.554 moles) of pivaloyl chloride (MW=120.45) was dissolved in 100 ml of dry ether and added drop-wise to the Teracol solution over a two hour period. The reaction mixture was stirred overnight at room temperature. Ether was added as necessary to maintain volume. The reaction mixture was then cooled in an ice bath and suction filtered to remove $Et_3N \cdot HCL$. The ether layer was washed twice with 50 ml portions of 10% $H_2SO_4$, twice with 50 ml portions of saturated $Na_2CO_3$ solution, and twice with 50 ml portions of distilled water. The pH of the washed product was obtained to assure its neutrality. The ether layer was separated and dried overnight over 250 g of $Na_2SO_4$. The ether was removed from the product by rotary evaporation.

An illustration showing the use of the novel internal plasticizer of this invention in a solid propellant is shown in Table I as follows. Although ammonium perhlorate and isocyanate cured polybutadiane binder are preferred, other conventional oxidizing and resinous binders may be utilized, if desired, as well as other conventional propellant components.

Solid propellant compositions are well known and since the basic preparation and constituent ingredients of the propellant compositions of this invention are not significantly altered or critical to the execution of the invention, with the exception of the internal plasticizer component, a detailed explanation of the propellant's preparation is not deemed necessary. The plasticizers of this invention are pre-reacted with the isocyanate curing agent, and then incorporated into the propellant mix in a conventional manner at any state prior to cure. Generally, all of the ingredients are homogenously mixed in a conventional blender. After mixing, the uncured propellant mix is then placed in an oven and cured at a temperature and for a period of time sufficient to produce a firm, rubbery, solid propellant. The resulting propellant differs from a conventional propellant composition only in the essential replacement of a conventional plasticizer with the novel internal plasticizer of this invention.

TABLE I 68.0 parts by weight of ammonium perchlorate 7.45 parts by weight of hydroxy-terminated polybutadiene (R-45M)

22.0 parts by weight of aluminum powder fuel 0.25 parts by weight of a curing agent, isophorone diisocyanate (IPDI)

2.0 parts by weight of the internal plasticizer of this invention which was first prereacted with IPDI 0.30 parts by weight of a bonding agent, HX-752

0.075 parts by weight of a delayed quick-cure catalyst (equal parts MgO, Triphenyl Bismuth, and Maleic Anhydride)

The above ingredients were thoroughly mixed in a conventional mixer until a homogenous mixture had been obtained. The uncured propellant was then placed in an oven at 170° F. for 7 days. After that period of time; a firm, rubbery, solid propellant was obtained.

Table II, which follows, illustrates a conventional propellant composition using dioctyl adipate (DOA) as an internal plasticizer with a propellant of the type exemplified in Table I.

TABLE II

| FORMULATION OF DOA ANALOG PLASTICIZED PROPELLANT | |
|---|---|
| INGREDIENT | PARTS BY WEIGHT OF MIX |
| DOA | 2.0 |
| MAGNESIUM OXIDE | 0.025 |
| ALUMINUM | 22.0 |
| AP 200 | 51.0 |
| AP 6900 | 17.0 |
| MALEIC ANHYDRIDE | 0.025 |
| TRIPHENYL BISMUTH | 0.025 |
| R45M BINDER | 8.0 |

Tables III and IV provide gel fractions and viscosities of the propellants of Tables I and II while Table V sets forth the physical properties of the two propellant mixtures, for purposes of comparison. It can be seen that the plasticizers of this invention provide the propellant with physical characteristics as good or better than dioctyl adipate while simultaneously providing a solution to the problem of plasticizer migration.

TABLE III

| GEL FRACTIONS OF ANALOG PLASTICIZED PROPELLANTS | | | |
|---|---|---|---|
| Propellant | MIX NO. | GEL FRACTION | AMBIENT STRESS |
| No Plasticizer | 8823T | 0.413 | 103 |
| Table II | 8774T | 0.461 | 162 |
| Table I | 219 | 0.349 | 100 |

TABLE III-continued

| | | GEL | AMBIENT |
|---|---|---|---|
| Propellant | MIX NO. | FRACTION | STRESS |
| | 227 | 0.839 | 300 |

TABLE IV

VISCOSITIES OF PLASTICIZERS IN R-45M

| Temp °F. | R-45M | Plasticizer of Table II | Plasticizer of Table I |
|---|---|---|---|
| 128° F. | 293[2] | 146[1] | 282 |
| 74° F. | 1281 | 448 | 729 |
| 28° F. | 6520 | 1808 | OFF SCALE |

[1] 20% PLASTICIZER USED IN R-45M.
[2] ALL VISCOSITIES GIVEN IN CPS.

TABLE V

PHYSICAL PROPERTIES OF PLASTICIZED PROPELLANTS

| | −65° F. TEST TEMPERATURE | | |
|---|---|---|---|
| Propellant | STRESS | STRAIN MAX*/FAIL** | MODULUS |
| of Table II | 730 | 9/17 | 20,400 |
| of Table I | 1170 | 3/3 | 60,000 |

| | AMBIENT TEST TEMPERATURE | | | 165°, TEST TEMPERATURE | | |
|---|---|---|---|---|---|---|
| | STRESS | MAX*/FAIL** | MODULUS | STRESS | MAX*/FAIL** | MODULUS |
| Table II | 162 | 26/28 | 1310 | 133 | 25/26 | 2280 |
| Table I | 100 | 21/30 | 1260 | | | |

*STRAIN AT MAX STRESS
**RUPTURE STRAIN
Table VI discloses additional physical properties of the propellant composition of Tables I and II.

TABLE VI

PHYSICAL PROPERTIES OF ANALOG PLASTICIZED PROPELLANTS

| | | | Binder to | −65° F. Test Temperature | | |
|---|---|---|---|---|---|---|
| Propellant | Mix No. | Cure Ratio | Plasticizer Ratio | Stress | Strain Max*/Fail** | Modulus |
| of Table II | 118 | 0.77 | 80:20 | | | |
| | 117 | 0.80 | 80:20 | | | |
| | 119 | 0.83 | 80:20 | | | |
| | 8774T | 0.77 | 80:20 | 730 | 8.5/17 | 20,400 |
| of Table I | 216 | 0.85 | 90:10 | 1065 | 5.0/5.0 | 44,800 |
| | 217 | 0.95 | 85:15 | | | |

| Ambient Test Temperature | | | 165° F., Test Temperature | | | Shore A |
|---|---|---|---|---|---|---|
| Stress | Strain Max*/Fail** | Modulus | Stress | Strain Max*/Fail** | Modulus | |
| | | | Table II | | | |
| 134 | 22/24 | 1060 | | | | 67 |
| 134 | 15/16 | 1330 | | | | 62 |
| 212 | 9.2/10.2 | 4776 | | | | 78 |
| 162 | 26/28 | 1310 | 133 | 25/26 | 1180 | 72 |
| | | | Table I | | | |
| 129 | 19/43 | 1560 | 81 | 27/29 | 530 | 69 |
| 85 | 18/36 | 1100 | | | | 53 |

While the present invention has been described by reference to particular embodiments, it should be understood by those skilled in the art that all the modifications that are embodied within the scope of the appended claims are intended to be included herein.

What is claimed is:

1. A solid propellant composition comprising a cured homogenous mixture of:
   A. a solid, particulate oxidizer component;
   B. a synthetic resinous, polyisocyanate cured, polybutadiene binder component; and
   C. a polytetramethyleneglycol pivalate ester plasticizer having the following structual formula:

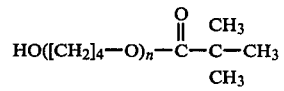

wherein n is an integer of from 6 to 12 and said plasticizer is present in a binder/plasticizer ratio ranging from about 75 to 95 parts by weight of binder to 5 to 25 parts by weight of plasticizer.

* * * * *